United States Patent
Ebina et al.

(10) Patent No.: US 7,717,496 B2
(45) Date of Patent: May 18, 2010

(54) STRUCTURE OF A VEHICULAR BODY

(75) Inventors: Kara Ebina, Kanagawa (JP); Koumei Iwata, Atsugi (JP); Ken Koganezawa, Atsugi (JP); Takayoshi Nomura, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 25 days.

(21) Appl. No.: 11/896,859

(22) Filed: Sep. 6, 2007

(65) Prior Publication Data

US 2008/0061600 A1   Mar. 13, 2008

(30) Foreign Application Priority Data

Sep. 12, 2006 (JP) ............... 2006-247027

(51) Int. Cl.
*B62D 25/00* (2006.01)
(52) U.S. Cl. .............. 296/187.12; 296/193.05; 296/203.03
(58) Field of Classification Search .......... 296/106, 296/146.8, 187.11, 187.12, 203.03, 205, 296/56, 180.1, 187.1, 187.03, 146.6, 193.05, 296/193.06, 203.04
See application file for complete search history.

(56) References Cited

U.S. PATENT DOCUMENTS

| | | | | |
|---|---|---|---|---|
| 2,986,423 A | * | 5/1961 | Barenyi | 296/203.01 |
| 5,224,752 A | * | 7/1993 | Marshall | 296/146.1 |
| 5,228,741 A | | 7/1993 | Ide | |
| 5,645,312 A | * | 7/1997 | Enning et al. | 296/203.04 |
| 5,800,007 A | * | 9/1998 | Cho | 296/146.6 |
| 6,073,993 A | * | 6/2000 | Iwatsuki et al. | 296/203.04 |
| 6,099,039 A | * | 8/2000 | Hine | 280/781 |
| 6,312,045 B2 | * | 11/2001 | Kitagawa | 296/187.12 |
| 6,776,449 B2 | * | 8/2004 | Komatsu et al. | 296/146.5 |
| 6,869,136 B2 | * | 3/2005 | Igarashi et al. | 296/204 |
| 6,926,340 B2 | * | 8/2005 | Moriyama | 296/146.6 |
| 7,390,054 B2 | * | 6/2008 | Suzuki | 296/187.12 |

FOREIGN PATENT DOCUMENTS

| | | |
|---|---|---|
| EP | 1 695 851 A2 | 8/2006 |
| JP | 10-244963 | 9/1998 |
| JP | 2004-276817 | 10/2004 |
| JP | 2006-232052 | 9/2006 |

* cited by examiner

*Primary Examiner*—Patricia L Engle
*Assistant Examiner*—Pinel E Romain
(74) *Attorney, Agent, or Firm*—Drinker Biddle & Reath LLP

(57) ABSTRACT

A crash load absorption structure of a vehicular body having a side member at a bottom of the vehicular body extending in a forward-rearward direction and a pillar extending in an upward-downward direction. The structure of the vehicular body includes a side body bar located upward from the side member at a side portion of the vehicular body, the side body bar extending in the forward-rearward direction and being adapted to transfer a portion of the crash load to the pillar, and a connecting bar that connects the side member and the side body bar.

14 Claims, 8 Drawing Sheets

FR ←

US 7,717,496 B2

STRUCTURE OF A VEHICULAR BODY

CROSS-REFERENCE TO RELATED APPLICATIONS

This application claims priority under 35 U.S.C. §119 to Japanese Patent Application No. 2006-247027, filed on Sep. 12, 2006, the disclosure of which is incorporated by reference herein in its entirety.

BACKGROUND OF THE INVENTION

1. Field of the Invention

The present invention relates to a structure of a vehicular body, and more particularly to a vehicular body structure designed to absorb an impact.

2. Description of Related Art

A related structure of a vehicular body includes a pair of right and left side members extending along the front-rear direction of a vehicle and disposed underneath the vehicular body. The rear ends of the side members are connected to each other using a rear end cross member. In such a structure, a crash load exerted on the rear end cross member is transmitted from the rear end cross member to the side members. To this end, the side members become deformed when absorbing the crash load. However, to absorb a high crash load by using such a structure, the side members must be long, thereby causing the vehicle to be longer in size.

BRIEF SUMMARY OF THE INVENTION

An object of the present invention is to increase the crash load absorption when a crash occurs, while minimizing the length of a vehicular body.

In an embodiment, the invention provides a crash load absorption structure of a vehicular body having a side member at a bottom of the vehicular body extending in a forward-rearward direction and a pillar extending in an upward-downward direction. The structure of the vehicular body includes a side body bar located upward from the side member at a side portion of the vehicular body, the side body bar extending in the forward-rearward direction and being adapted to transfer a portion of the crash load to the pillar, and a connecting bar that connects the side member and the side body bar.

In another embodiment, the invention provides a method of transferring a crash load of a vehicular body, including transferring the crash load from a side member at a bottom of the vehicular body extending in a forward-rearward direction, to a pillar extending in an upward-downward direction, via intervening crash-load transfer structure.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

First Preferred Embodiment

Figure 1:
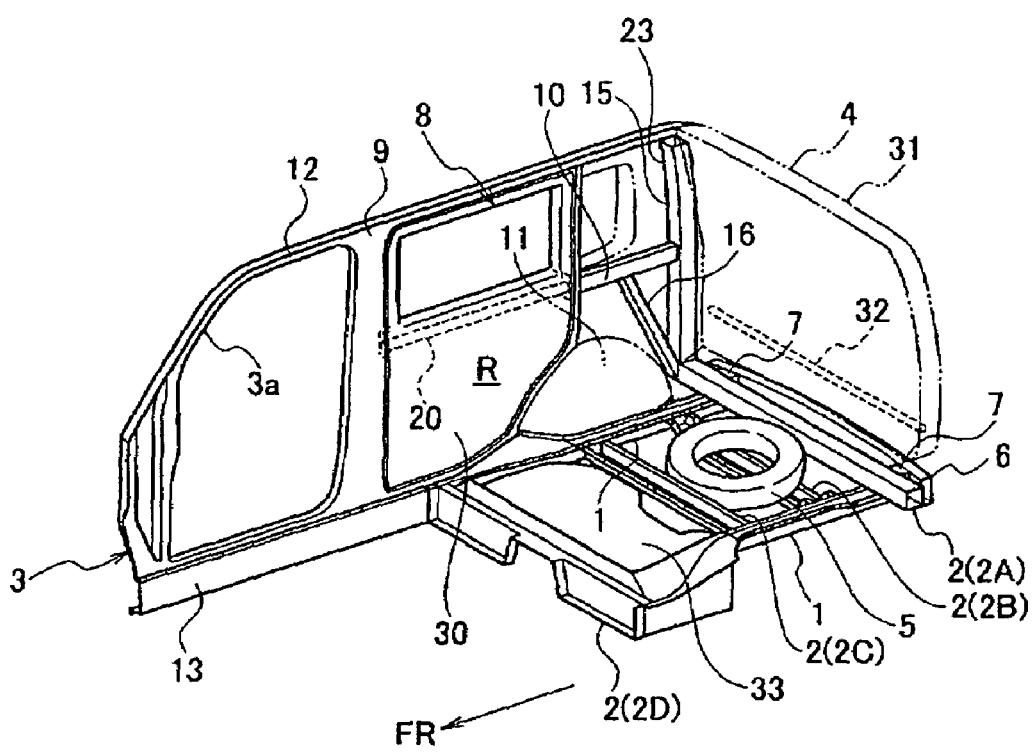
FIG. 1 is a schematic perspective view illustrating a structure of a vehicular body in accordance with a first preferred embodiment of the present invention.
Figure 2:
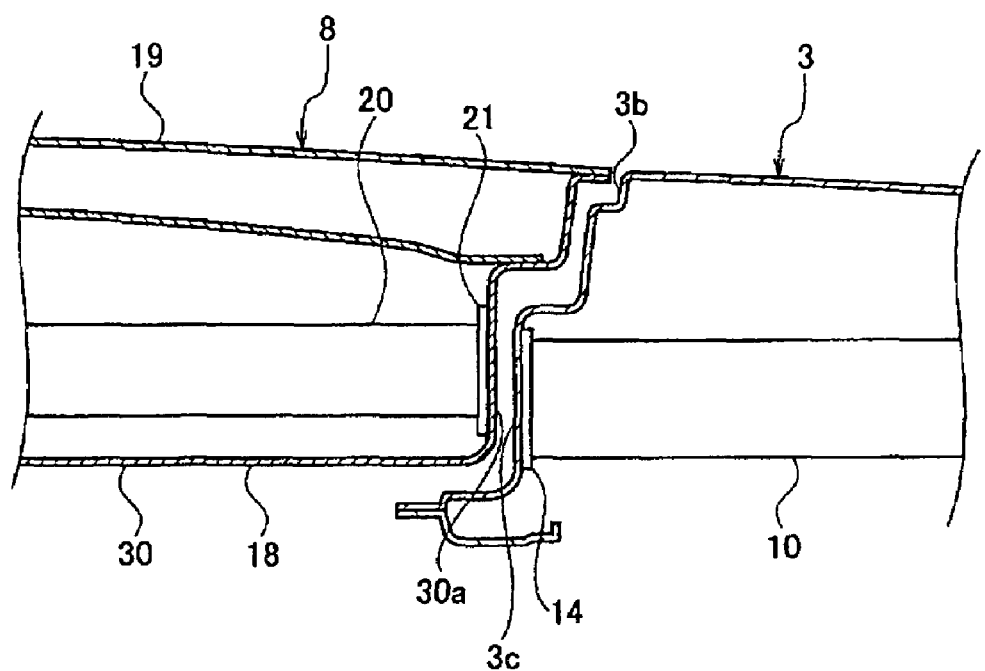
FIG. 2 is a horizontal sectional view illustrating a facing portion of a body side bar and a side door bar in accordance with the first preferred embodiment of the present invention.
Figure 2:
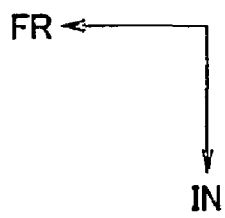
Figure 3:
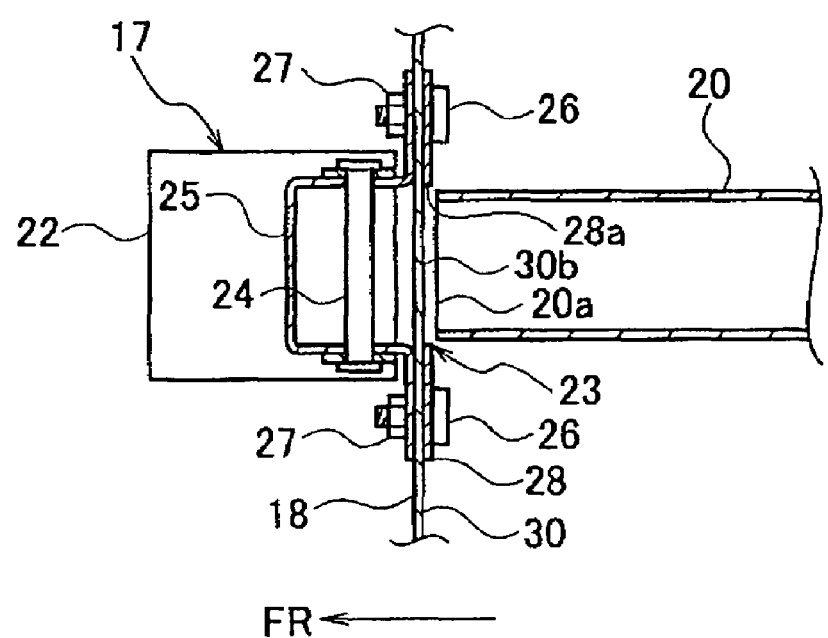
FIG. 3 is a horizontal sectional view illustrating a side door bar and a side door hinge in accordance with the first preferred embodiment of the present invention.
Figure 4:
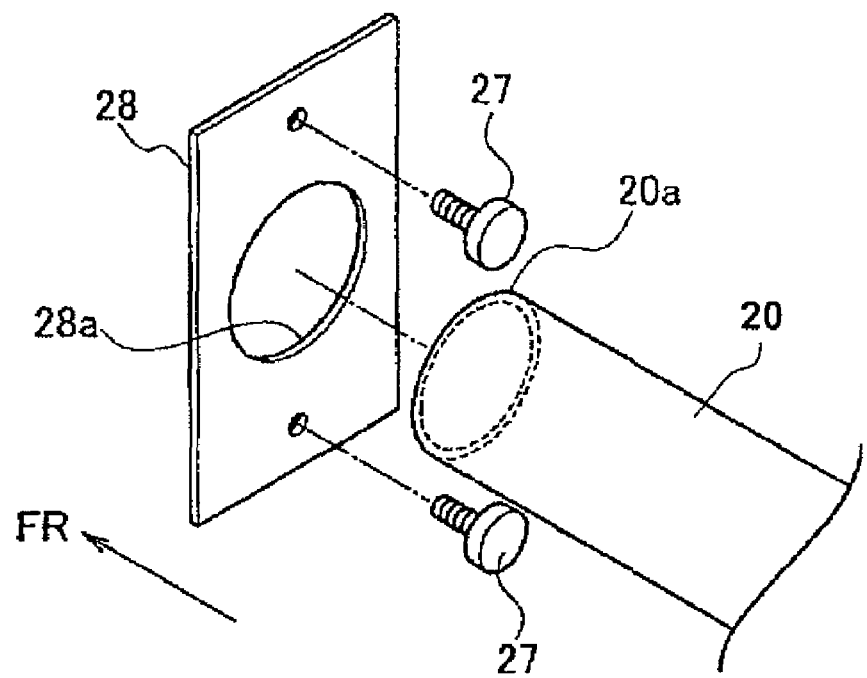
FIG. 4 is an exploded perspective view illustrating a side door bar and a hinge plate in accordance with the first preferred embodiment of the present invention.
Figure 5:
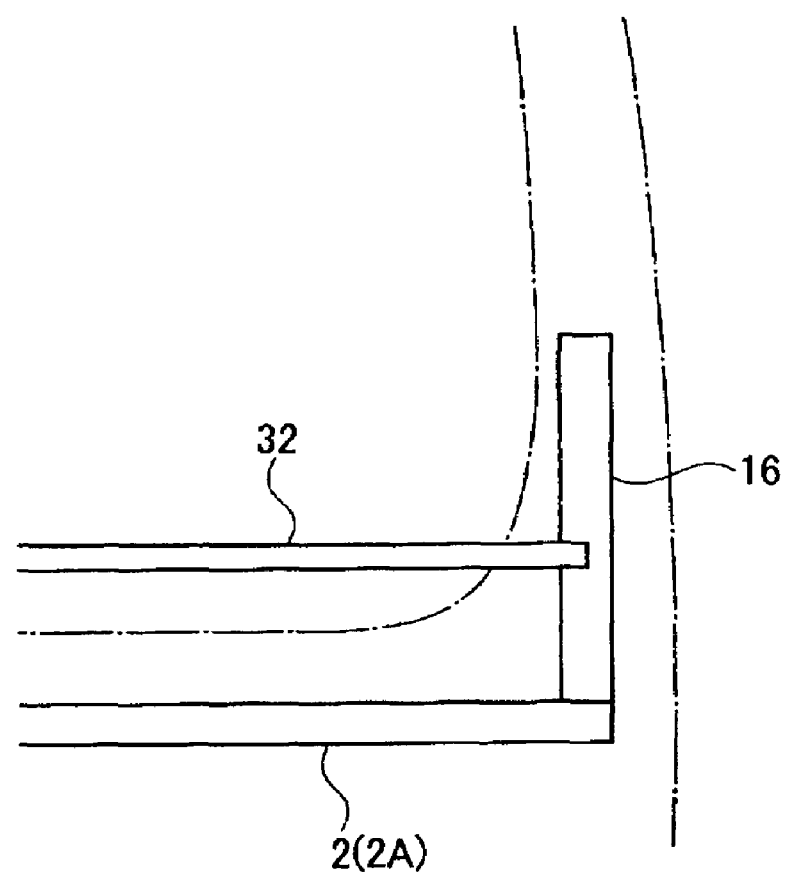
FIG. 5 is a rear view illustrating a portion of a structure of a vehicular body in accordance with the first preferred embodiment of the present invention.

A first preferred embodiment of the present invention will be explained with reference to FIGS. 1 to 5. The first preferred embodiment is an example of a structure of a vehicular body for a mini van, wherein a vehicular compartment is formed at a rear portion of the vehicle. FIG. 1 is a schematic perspective view illustrating a structure of a vehicular body in accordance with the first preferred embodiment. FIG. 2 is a horizontal sectional view illustrating a facing portion of a body side bar and a side door bar. FIG. 3 is a horizontal sectional view illustrating a side door bar and a side door hinge. FIG. 4 is an exploded perspective view illustrating a side door bar and a hinge plate. FIG. 5 is a rear view illustrating a portion of a vehicular body. Further, the reference numeral "FR" indicates a front direction along the front-rear direction of the vehicle, whereas the reference numeral "IN" indicates a vehicular compartment side along the lateral direction of the vehicle.

As shown in FIG. 1, the structure of the vehicular body includes rear side members 1, which are a pair of right and left side members extending along the front-rear direction of the vehicle at a bottom of the vehicle. The rear side members 1 are connected by a plurality of cross members 2 (2A to 2D) extending along the lateral direction of the vehicle. A pair of right and left body side panels 3 (the left body side panel is not shown) placed at a side portion of the vehicle are disposed at right and left sides of the rear side members. A back door 4 is disposed at a rear end of the vehicle. A floor panel (not shown) forming a bottom surface of the vehicular compartment R is disposed on an upper surface of the rear side member 1. A roof panel (not shown) is disposed between upper ends of the body side panels 3. A spare tire 5 can be accommodated between the rear side members 1. Specifically, the spare tire 5 is accommodated within a spare tire receiving portion (not shown) formed in the floor panel.

Each cross member 2 will now be explained. Among the cross members 2, the cross member 2 located at a rearmost portion is a rear end cross member 2A connecting the rear ends of the rear side members 1. The rear end cross member 2A is formed to have an angular pipe shape and is bonded on an upper surface of the rear end of the rear side member 1. The rear end cross member 2A is connected to a rear bumper reinforcement 6 extending from a rear position of the rear end cross member 2A along the lateral direction of the vehicle via a pair of right and left bumper stays 7. A cross member 2B placed immediately forward of the rear end cross member 2A is a support member for supporting the spare tire 5 from underneath via the spare tire receiving portion. The cross member 2 placed immediately forward of the cross member 2B is a rear center cross member 2C. The spare tire receiving portion is formed between the rear center cross member 2C and the rear end cross member 2A so as to receive the spare tire 5. Specifically, the upper and lower positions of the rear center cross member 2C and the rear end cross member 2A are identical to those of the spare tire 5, which is accommodated within the spare tire receiving portion. A cross member 2D placed immediately forward of the rear center cross member 2C connects the front ends of the rear side members 1. Both the left and right ends of the cross member 2 are bonded to a side sill 13, as explained below. A fuel tank 33 is disposed between the cross member 2D and the rear center cross member 2C.

The body side panel 3 will now be described. The body side panel 3 is provided with a front door opening 3a and a rear door opening 3b (shown in FIG. 2). A front side door (not shown) and a rear side door 8 are disposed within the front door opening 3a and the rear door opening 3b, respectively. The body side panel 3 is provided with a center pillar 9 extending along the up-down direction of the vehicle between the front door opening 3a and the rear door opening 3b, a body side bar 10 at the rear of the rear door opening 3b, a rear tire house 11 below the body side bar 10, and a rear pillar 15 at a rear end of the body side panel 3 and extending along the up-down direction of the vehicle. A roof rail 12 is provided at an upper end of the body side panel 3 at a position which becomes an upper end of a side portion of the vehicle. A side sill 13 is provided at a lower end of the body side panel 3. A front portion of the rear side member 1 is connected to the side sill 13.

The body side bar 10 is positioned at a portion disposed higher than the rear side member 1 at the side portion of the vehicle and extends along the front-rear direction of the vehicle. The body side bar 10 is formed to have an angular pipe shape. A plate 14 is provided at a front end of the body side bar 10 and is bonded to an inner wall surface of the rear door opening 3b. A rear end of the body side bar 10 is bonded to the rear pillar 15.

The body side bar 10 is connected to the rear end cross member 2A via a connecting bar 16. Specifically, the right body side bar 10 is connected to a right end of the rear end cross member 2A via the right connecting bar 16. Further, the left body side bar is connected to a left end of the rear end cross member 2A via the left connecting bar (not shown). In addition, the body side bar 10 is also bonded to the body side panel 3.

The connecting bar 16 is formed to have an angular pipe shape. A lower end of the connecting bar 16 is bonded to an end of the rear end cross member 2A along the lateral direction of the vehicle. An upper end of the connecting bar 16 is bonded to the body side bar 10 such that the connecting bar 16 is forwardly and upwardly inclined. It is preferred that the connecting bar 16 is inclined as much as possible to the extent that the rear tire house 11 is not interfered. Further, the connecting bar 16 is also bonded to the body side panel 3.

In the first preferred embodiment of the present invention, the connecting bar 16 and the body side bar 10 are formed to be weaker than the rear side member 1. That is, a bottom of the vehicular body where the rear side member 1 is disposed is more rigid than a side portion of the vehicular body where the connecting bar 16 and the body side bar 10 are disposed.

The rear side door 8 is positioned at a side portion of the vehicle and is rotatably supported by a side door hinge 17 with respect to the center pillar, such that the side door hinge 17 is provided over the center pillar 9 and the rear side door 8 (shown in FIG. 3). The rear side door 8 is rotatable with respect to a horizontal direction. The rear side door 8 is placed at the rear of the center pillar 9 as well as at the front of the connecting bar 16 and the body side bar 10 in a closed state.

As shown in FIG. 2, the rear side door 8 has a door body 30 formed to have a hollow shape by an inner panel 18 and an outer side panel 19, which are bonded to each other. A cylindrical side door bar 20 extending along the front-rear direction of the vehicle in a closed state of the rear side door 8 is provided within the door body 30. As used herein, "side body bar" may include both body side bar 10 and side door bar 20.

A plate 21 is provided at a rear end of the side door bar 20. Further, the plate 21 is bonded to the door body 30 (inner panel 18). The plate 21 is faced to the plate 14 provided at the front end of the body side bar 10 along the front-rear direction of the vehicle when the rear side door 8 is in a closed state. Preferably, a facing portion 30a of the door body 30 and a facing portion 3c of the body side panel 3 are formed to have as a longitudinal wall shape approximately vertical to an axis along the front-rear direction of the vehicle. The facing portions 30a and 3c are placed between the side door bar 20 and the body side bar 10. The facing portions 30a and 3c are positioned so as to face each other. Further, the body side panel 3 constitutes a peripheral surface of the rear door opening 3b. In the first preferred embodiment, the facing portion 30a of the door body 30 is constituted by the inner panel 18.

Further, as shown in FIGS. 3 and 4, a leading end of the side door bar 20 is a front end coupling portion 20a, which can be coupled to a wall side coupling portion 23. The side door hinge 17 is positioned in front of the side door bar 20 when the rear side door 8 is in a closed state. The side door hinge 17 is provided with a fixing member 22 fixed to the center pillar, a rotary member 25 pivotably engaged to the fixing member 22 via a supporting shaft 24, and a hinge plate 28 connected to the rotary member 25 by a bolt 26 and a nut 27. The position of the side door hinge 17 of the center pillar 9 is reinforced by a reinforcing member (not shown) so as to support the rear side door 8. The rotary member 25 is disposed at an outer surface of the inner panel 18, while the hinge plate 28 is disposed at an inner surface of the inner panel 18.

A circular coupling hole 28a having a diameter larger than that of the cylindrical side door bar 20 is formed in the hinge plate 28. The wall side coupling portion 23 is constituted by the coupling hole 28a and an inner surface 30b of a front wall portion of the door body 30 exposed from the coupling hole 28a such that a concave portion is formed in an inner diametric surface of the coupling hole 28a and the inner surface 30b of the front wall portion. The wall coupling portion 23 is positioned in front of a front end coupling portion 20a of the side door bar 20 when the rear side door 8 is in a closed state. Therefore, when the side door bar 20 moves toward the front of the vehicle, the front end coupling portion 20a is disposed such that it penetrates through the concave portion formed in the inner diametric surface of the coupling hole 28a and the inner surface 30b of the inner wall portion, and then couples to the wall side coupling portion 23.

The back door 4 will now be explained with reference to FIGS. 1 and 5. The back door 4 is disposed in a back door opening formed at a rear end of the vehicle. The back door 4 is rotatably supported by a hinge (not shown), which is provided at an upper periphery or a side periphery of the back door opening. Preferably, the back door opening is formed over and between the rear ends of the body and the side panels.

The back door 4 has a door body 31 formed to have a hollow shape by a plate member. A cylindrical back door bar 32 extending along the lateral direction of the vehicle is provided within the door body 31. The back door bar 32 is fixed to the door body 31. When the back door 4 is in a closed state, the back door bar 32 extends along the lateral direction of the vehicle at a position higher than the rear end cross member 2A. Both ends are placed at the rear of the connecting bar 16 along the lateral direction of the vehicle.

When a rear crash occurs, a crash load exerted from the rear bumper reinforcement 6 to the rear end cross member 2A is transmitted from the rear end cross member 2A to the rear side member 1. It is also transmitted from the rear side member 1 to the side sill 13 and the center pillar 9 via the connecting bar 16, the body side bar 10 and the side door bar 20. To this end, the rear side member 1, the connecting bar 16, the body side bar 10 and the side door bar 20 become deformed in order to absorb a shock load. As such, the crash load exerted upon the rear end cross member 2A is dispersed and absorbed by the bottom of the vehicular body (rear side member 1) and the side portion of the vehicular body (connecting bar 16, body side bar 10, side door bar 20 and center pillar 9). By doing so, the crash load to the rear side member is smaller than when the crash load is not dispersed. Thus, the crash load absorption during a rear crash can be increased without increasing the length of the rear side member 1 in order to increase the crash load absorption. That is, the crash load absorption during a rear crash can be increased while minimizing the length of the vehicular body.

Further, the exertion of crash load to the rear side member 1 is decreased. As such, the cross-section of the rear side member can be smaller, thereby enlarging the vehicular compartment R.

In the first preferred embodiment, when the rear side door 8 is in a closed state, a front end of the body side bar 10 (plate 14) and a rear end of the side door bar 20 (plate 21) are faced with each other in the front-rear direction of the vehicle. Therefore, when the rear crash occurs, the crash load exerted upon the rear end cross member 2A is effectively transmitted to the side door bar 20 and the center pillar 9 via the connecting bar 16 and the body side bar 10. To this end, since the side door bar 20 and the center pillar 9 improves the absorption of the crash load, the crash load can be more effectively and broadly absorbed by the vehicular body.

Further, the facing portion 30a of the door body 30 of the rear side door 8 and the facing portion 3c of the body side panel 3 are formed in a longitudinal wall shape approximately vertical to an axis along the front-rear direction of the vehicle. The facing portions 30a and 3c, which face each other, are placed between the side door bar 20 and the body side bar 20. Accordingly, the crash load can be more effectively transmitted from the body side bar 10 to the side door bar 20.

In the first preferred embodiment, the side door hinge 17 for rotatably supporting the rear side door 8 with respect to the center pillar 9 is provided so as to face a front end of the side door bar 20 in the front-rear direction of the vehicle. By doing so, the crash load to the front exerted from the side door bar 20 during a rear crash can be received about the reinforced side door hinge 17. Accordingly, a local deformation of the center pillar 9 can be prevented.

Further, in the first preferred embodiment, there are provided the front end coupling portion 20a and the wall side coupling portion 23. The front end coupling portion 20a is provided at the front end of the side door bar 20. The wall side coupling portion 23 faces the side door hinge 17 of the inner surface 30b of the front wall portion of the rear side door 8 when the rear side door 8 is in a closed state. The wall side coupling portion 23 can be coupled to the front end coupling portion 20a. Therefore, the front end coupling portion 20a of the side door bar 20 pressed to the front by the body side bar 10 during a rear crash is coupled to the wall side coupling portion 23, thereby preventing the side door bar 20 from falling downward during a rear crash. Consequently, the crash load can be better transmitted from the side door bar 20 to the center pillar 9.

In addition, in the first preferred embodiment, the back door 4 is provided at the rear portion of the vehicle, and the back door bar 32 is provided at the back door 4. When the back door 4 is in a closed state, the back door bar 32 extends along the lateral direction of the vehicle at a position higher than the rear end cross member 2A. Further, both ends thereof along the lateral direction of the vehicle are placed at the rear of the connecting bar 16. Thus, for example, when a bumper of another vehicle, which is higher than rear bumper reinforcement 6, crashes into the rear surface of the vehicle, the crash load exerted upon the back door bar 32 can be transmitted to the body side bar 10 via the connecting bar 16. Such a load can then be transmitted from the body side bar 10 to the center pillar 9 via the side door bar 20.

In the first preferred embodiment, the connecting bar 16 is forwardly and upwardly inclined. The crash load exerted upon the rear end cross member 2A during a rear crash can be better transmitted to the body side bar 10 compared to when the connecting bar 16 is provided along the perpendicular direction. Accordingly, the crash load can be more effectively dispersed by the bottom and side portions of the vehicle.

The connecting bar 16 and the body side bar 10 are weaker than the rear side member 1. Therefore, since the connecting bar 16 and the body side bar 10 are more easily crushed than the rear side member 1 during a rear crash, the vehicle can be guided toward an upper direction. Accordingly, the crash load can be more effectively dispersed by the bottom and side portions of the vehicle.

In the first preferred embodiment, there is provided the rear center cross member 2C, which is a cross member extending along the lateral direction of the vehicle at a position forward of the rear end cross member 2A and configured to connect the rear side members 1. The spare tire 5 is accommodated between the rear center cross member 2C and the rear end cross member 2A. Therefore, during a rear crash, the rear side member 1 is deformed so as to move to the front and the spare tire 5 is fitted in the rear side member 1 and the rear center cross member 2C. By doing so, the spare tire 5 becomes deformed so as to absorb the crash load. Thus, the crash load exerted upon the rear end cross member 2A during a rear crash can be absorbed by dispersing to the rear side member 1, the side portion of the vehicle (connecting bar 16, body side bar 10, rear side door 8 bar and center pillar 9) and the spare tire 5.

A modified example of the first preferred embodiment will now be explained wherein the rear side door is a slide door (not shown), which is moveable along the front-rear direction of the vehicle. In such a case, the body side bar is preferably a guide rail (not shown) for guiding the rear side door along the front-rear direction of the vehicle. Further, a single member may serve as both the guide rail and the body side bar. Thus, the number of components can be reduced.

Second Preferred Embodiment

Figure 6:
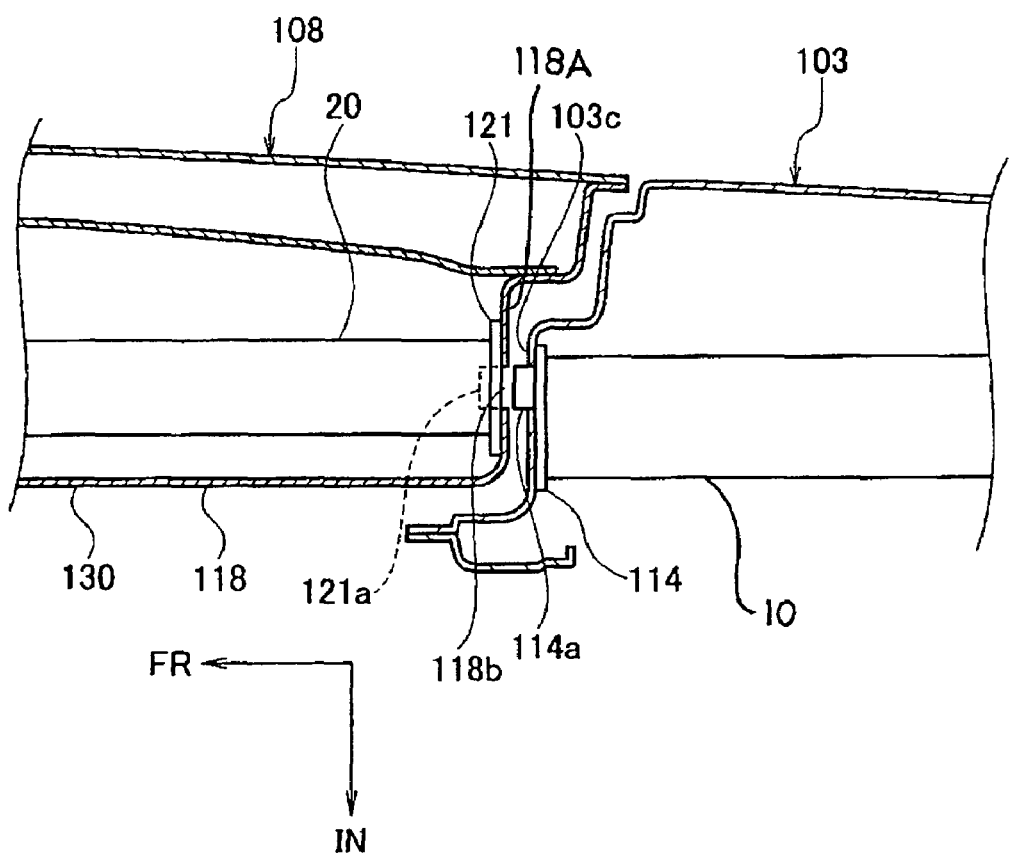
FIG. 6 is a horizontal sectional view illustrating a facing portion of a body side bar and a side door bar in accordance with a second preferred embodiment of the present invention.

Next, a second preferred embodiment of the present invention will be explained with reference to FIG. 6. In the second embodiment, as well as the third and fourth embodiments described below, the same portions described in the above first embodiment are denoted by the same reference numerals and the explanations thereof will be omitted herein. FIG. 6 is a horizontal sectional view illustrating the facing portion of the body side bar and the side door bar in accordance with the second preferred embodiment.

The second preferred embodiment differs from the first preferred embodiment in that a coupling structure is provided at the side door bar 20 and the body side bar 10. A concave portion 121a, which is a rear end coupling portion, is formed at a plate 121 of a rear end of the side door bar 20. The concave portion 121a opens toward the rear. Further, a pin-shaped convex portion 114a, which is a coupling portion of the body side bar side, protrudes toward the front in a plate 114 of a front end of the body side bar 10. The convex portion 114a penetrates through a facing portion 103c of a body side panel 103. When the side door is in a closed state, the convex portion 114a is placed at the rear of the concave portion 121a and is configured to couple to the concave portion 121a. Further, a through hole 118b is formed in a facing portion 118a of a door body 130 (inner panel 118) of a rear side door 108. The through hole 118b communicates with the concave portion 121a and allows the engagement between the concave portion 121a and the convex portion 114a.

As explained above, the second preferred embodiment includes the concave portion 121a, which is a rear end coupling portion provided at the rear end of the side door bar 20, and the convex portion 114a, which is a body side bar side coupling portion configured to couple to the concave portion 121a. The convex portion 114a is provided at the front end of the body side bar 10 so as to be placed at the rear of the concave portion 121a when the rear side door is in a closed state. Thus, the body side bar 10 pressed from the rear during a rear crash moves to the front so that the convex portion 114a is engaged to the concave portion 121a. To this end, a downward displacement of the body side bar 10 during a rear crash can be prevented. As such, the crash load can be better transmitted from the body side bar 10 to the side door bar 20 and the center pillar 9.

Third Preferred Embodiment

Figure 7:
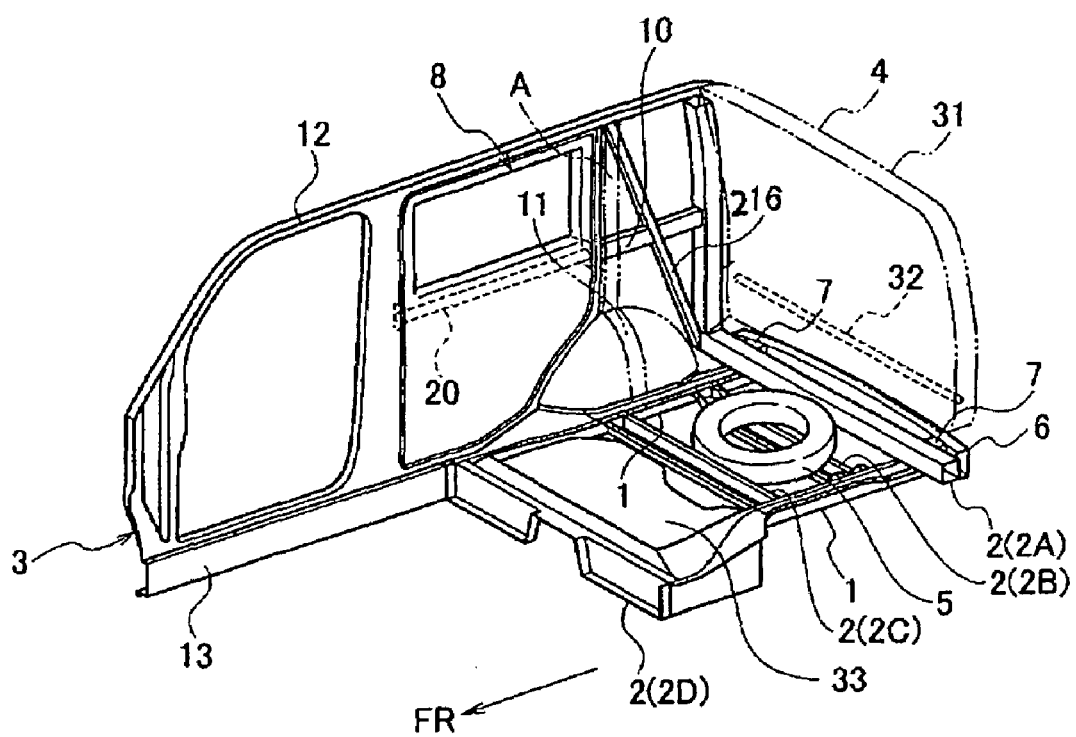
FIG. 7 is a schematic perspective view illustrating a structure of a vehicular body in accordance with a third preferred embodiment of the present invention.

Next, a third preferred embodiment of the present invention will be explained with reference to FIG. 7. FIG. 7 is a schematic perspective view illustrating a structure of a vehicular body in accordance with the third preferred embodiment. The present preferred embodiment differs from the above-mentioned embodiments in that an upper end of a connecting bar 216 extends and connects to the roof rail 12. In the third preferred embodiment, the roof rail 12 is provided at the upper end of the side portion of the vehicle and extends along the front-rear direction of the vehicle. Further, the upper end of the connecting bar 216 is connected to the roof rail 12. Accordingly, the crash load exerted upon the rear end cross member 2A during a rear crash is also exerted upon the roof rail 12 via the connecting bar 216. Therefore, the roof rail 12 becomes deformed in order to absorb the crash load. Thus, the crash load exerted upon the rear end cross member 2A during a rear crash can be better dispersed and absorbed.

Fourth Preferred Embodiment

Figure 8:
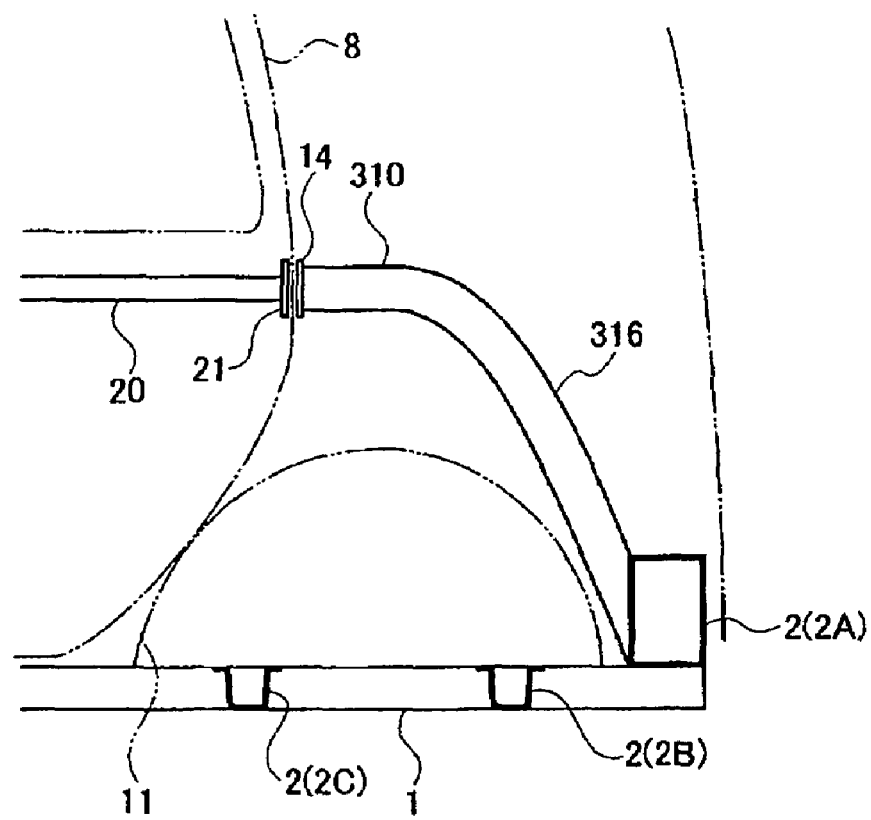
FIG. 8 is a side view of a side portion illustrating a portion of a structure of a vehicular body when viewed from an inside of the vehicle in accordance with a fourth preferred embodiment of the present invention.

Next, a fourth preferred embodiment of the present invention will be explained with reference to FIG. 8. FIG. 8 is a side view illustrating a side portion of the vehicular body when viewed from an inside of the vehicle in accordance with the fourth preferred embodiment. The present preferred embodiment differs from the above-mentioned embodiments in that a connecting bar 316 and a body side bar 310 are integrally formed. Further, although FIG. 8 illustrates an example wherein the fourth preferred embodiment is applied to the first preferred embodiment, the present preferred embodiment may also be applied with respect to the second and third preferred embodiments. In the fourth preferred embodiment, the connecting bar 316 and the body side bar 310 are integrally formed. Thus, the number of components can be reduced.

While the invention has been disclosed with reference to certain preferred embodiments, numerous modifications, alterations, and changes to the described embodiments are possible without departing from the sphere and scope of the invention, as defined in the appended claims and equivalents thereof. For example, a pillar extending along the up-down direction may be formed at a rear side edge portion (indicated by A in FIG. 7) of the rear door opening 3b. In such a case, the crash load is also transmitted to the pillar from the body side bar 10. Moreover, the present invention may be applied to different types of vehicles, including the following types of vehicles with respective pillar structures. For vehicles with one side door, a vehicle having two pillars, i.e., an A pillar disposed at a foremost portion of a cabin and another pillar disposed at a rearmost portion of the cabin (e.g., compact or hard-top car). Alternatively, a vehicle having three pillars further including a B pillar disposed at a rear end of one selected door. For vehicles with two side doors, a vehicle having three pillars, i.e., A and B pillars disposed between first and second doors and a rear portion pillar (e.g. general sedans). Alternatively, a vehicle having four pillars further including a C pillar after a second pillar (e.g. large SUVs). Further, the invention may be applied to a vehicle in which the number of right and left doors or the side structure is not proportional. Also, the invention may be applied to the structure for a front portion of the vehicle. Accordingly, it is intended that the invention not be limited to the described embodiments, but that it have the full scope defined by the language of the following claims.

The invention claimed is:

1. A rear crash load absorption structure of a vehicular body, the vehicular body having a side member at a bottom of the vehicular body extending in a forward-rearward direction and a pillar extending in an upward-downward direction, the structure of the vehicular body comprising:

a side body bar located upward from the side member at a side portion of the vehicular body, the side body bar extending in the forward-rearward direction and being adapted to transfer a portion of a rear crash load to the pillar;

an end cross member extending in a lateral direction of the vehicle and connecting a rear end of the side member with a rear end of a second side member extending in the frontward-rearward direction on an opposite side of the vehicle;

a side door disposed rearward of the pillar, the side body bar including a side door bar disposed within the side door and extending in the frontward-rearward direction when the side door is in a closed state; and a connecting bar that extends upwardly and forwardly with respect to the side member to connect the side member and the side body bar, the side member and the connecting bar being connected via the end cross member, such that the connecting bar is adapted to transfer a portion of the rear crash load to the pillar via the side body bar.

2. The structure of the vehicular body of claim 1, the side body bar further comprising a body side bar to transfer the load between the side door bar and the connecting bar.

3. The structure of the vehicular body of claim 2, wherein in a closed state of the side door, an end of the side door bar faces an end of the body side bar in the forward-rearward direction of the vehicle.

4. The structure of the vehicular body of claim 3,
wherein the side door bar includes a side door bar coupling portion at one end in the forward-rearward direction, and
wherein the body side bar includes a body side bar coupling portion configured to couple to the side door bar coupling portion in a closed state of the side door.

5. The structure of the vehicular body of claim 2, wherein the connecting bar and the body side bar are integrally formed.

6. The structure of the vehicular body of claim 2, further comprising a side door hinge for rotatably supporting the side door from the pillar, and
wherein the side door hinge is disposed at a position facing an end of the side door bar in the forward-rearward direction of the vehicle.

7. The structure of the vehicular body of claim 6,
wherein the side door bar includes a side door coupling portion disposed at an end of the side door bar, and
wherein the side door is disposed at a position facing the side door hinge at an inner surface of a longitudinal wall portion of the side door in the forward-rearward direction and has a wall side coupling portion configured to couple to the side door bar coupling portion in a closed state of the side door.

8. The structure of the vehicular body of claim 1, the side body bar having a front end coupling portion for preventing the side door bar from falling downward during a rear crash.

9. The structure of the vehicular body of claim 1, wherein the connecting bar and the side body bar are weaker than the side member.

10. The structure of the vehicular body of claim 1, further comprising a roof rail disposed at an upper end of a side portion of the vehicle and extending in the forward-rearward direction, and
wherein an upper end of the connecting bar is connected to the roof rail.

11. The structure of the vehicular body of claim 1, further comprising a cross member extending in the lateral direction at a position forward of the end cross member and connecting the pair of side members, and
wherein a space configured to accommodate a spare tire is formed between the cross member and the end cross member.

12. The structure of the vehicular body of claim 1, further comprising a back door disposed at a rear portion of the vehicular body; and
a back door bar disposed within the back door, wherein the back door bar extends in the lateral direction at a position upward from the end cross member, and wherein an end of the back door bar in the lateral direction is placed at the rear of the connecting bar.

13. A method of transferring a rear crash load of a vehicular body, comprising:
transferring the crash load from a side member at a bottom of the vehicular body extending in a forward-rearward direction, to a pillar extending in an upward-downward direction, via intervening crash-load transfer structure including:
a connecting bar that extends upwardly and forwardly from the side member toward the pillar;
an end cross member that extends in a lateral direction of the vehicle and connects a rear end of the side member with a rear end of a second side member extending in the frontward-rearward direction on an opposite side of the vehicle;
a side body bar located upward from the side member at a side portion of the vehicular body and extending in the frontward-rearward direction, the side body bar including a side door bar disposed within a side door located rearward of the pillar, the side door bar extending in the frontward-rearward direction when the side door is in a closed state;
the side member and the connecting bar being connected via the end cross member, such that a portion of the rear crash load is transferred by the connecting bar to the pillar via the side body bar.

14. A rear crash load absorption structure of a vehicular body, the vehicular body having a side member at a bottom of the vehicular body extending in a forward-rearward direction and a pillar extending in an upward-downward direction, the structure of the vehicular body comprising:
a side body bar located upward from the side member at a side portion of the vehicular body, the side body bar extending in the forward-rearward direction and being adapted to transfer a portion of a rear crash load to the pillar; and
connecting means extending upwardly and forwardly with respect to the side member for connecting the side member and the side body bar;
end cross-connecting means extending in a lateral direction of the vehicle for connecting a rear end of the side member with a rear end of a second side member extending in a frontward-rearward direction on an opposite side of the vehicle;
wherein the side member and the connecting means are connected via the end cross-connecting means such that the connecting means is adapted to transfer a portion of the rear crash load to the pillar via the side body bar.

* * * * *